United States Patent
Huang

(10) Patent No.: US 10,019,436 B2
(45) Date of Patent: Jul. 10, 2018

(54) INPUT METHOD AND SYSTEM

(71) Applicant: Baidu Online Network Technology (Beijing) Co., Ltd, Beijing (CN)

(72) Inventor: Yihua Huang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 49 days.

(21) Appl. No.: 14/588,030

(22) Filed: Dec. 31, 2014

(65) Prior Publication Data

US 2015/0269137 A1    Sep. 24, 2015

(30) Foreign Application Priority Data

Mar. 19, 2014    (CN) .......................... 2014 1 0104464

(51) Int. Cl.
| | | |
|---|---|---|
| *G06F 17/28* | (2006.01) | |
| *G06F 17/27* | (2006.01) | |
| *G06F 17/22* | (2006.01) | |
| *G06F 3/01* | (2006.01) | |
| *G06F 3/023* | (2006.01) | |

(52) U.S. Cl.
CPC ............ *G06F 17/276* (2013.01); *G06F 3/018* (2013.01); *G06F 3/0233* (2013.01); *G06F 17/2223* (2013.01); *G06F 17/275* (2013.01); *G06F 17/289* (2013.01)

(58) Field of Classification Search
None
See application file for complete search history.

(56) References Cited

U.S. PATENT DOCUMENTS

| | | |
|---|---|---|
| 2005/0044495 A1 | 2/2005 | Lee et al. |
| 2005/0086590 A1 | 4/2005 | Lee et al. |
| 2010/0217581 A1 | 8/2010 | Hong |

(Continued)

FOREIGN PATENT DOCUMENTS

| | | |
|---|---|---|
| CN | 1384940 A | 12/2002 |
| CN | 1387639 A | 12/2002 |

(Continued)

OTHER PUBLICATIONS

EP, Extended European Search Report, European Application No. 14200675.8, dated May 6, 2015.

(Continued)

*Primary Examiner* — Kevin Ky
(74) *Attorney, Agent, or Firm* — Orrick, Herrington & Sutcliffe LLP

(57) ABSTRACT

The embodiments of the present invention provide an input method, comprising: receiving at least two input English characters; according to the at least two English characters, obtaining a first candidate entry based on a first language; according to the at least two English characters, obtaining a second candidate entry based on a second language; and according to the first candidate entry and the second candidate entry, obtaining a third candidate entry. The embodiments of the present invention also provide an input system. The technical solution provided according to the embodiments of the present invention can increase the accuracy of a candidate entry displayed in a candidate display box.

20 Claims, 3 Drawing Sheets

(a)

(b)

(56) References Cited

U.S. PATENT DOCUMENTS

| | | | | |
|---|---|---|---|---|
| 2012/0330990 | A1* | 12/2012 | Chen | G06F 17/28 707/761 |
| 2013/0262032 | A1* | 10/2013 | Ide | G06F 17/18 702/181 |
| 2014/0019115 | A1 | 1/2014 | Hong | |
| 2014/0379680 | A1* | 12/2014 | Chen | G06F 17/3064 707/706 |
| 2015/0106702 | A1* | 4/2015 | Scott | G06F 17/24 715/265 |
| 2015/0169971 | A1* | 6/2015 | Cummins | G06F 17/20 382/182 |
| 2015/0355727 | A1* | 12/2015 | Hu | G06F 3/04886 345/169 |

FOREIGN PATENT DOCUMENTS

| | | | |
|---|---|---|---|
| CN | 1387650 | A | 12/2002 |
| CN | 101286094 | A | 10/2008 |
| CN | 101587471 | A | 11/2009 |
| JP | H10-232863 | A | 9/1998 |

OTHER PUBLICATIONS

Ikegami, Y., et al., "Modeless Japanese Input Method Using Multiple Character Sequence Features," *2012 Eighth International Conference on Signal Image Technology and Internet Based Systems (SITIS)*, 2012 IEEE; pp. 613-618 (Nov. 25-29, 2012).

Zheng, Chen, et al., "A New Statistical Approach to Chinese Pinyin Input," *Proceedings of the 38th Annual Meeting of the Association for Computationak Linguistics*, ACL 2000; pp. 241-247 (Oct. 1-8, 2000).

CN, Chinese Search Report, Chinese Priority Application No. 201410104464.7, dated Mar. 29, 2016.

JP, Notice of Grounds for Rejection, Japanese Application No. 2014-264836, dated Feb. 14, 2017.

* cited by examiner (a)

(b)

INPUT METHOD AND SYSTEM

CROSS-REFERENCE TO RELATED APPLICATIONS

The present application claims priority to Chinese Patent Application No. CN201410104464.7, filed on Mar. 19, 2014, the entire disclosure of which is incorporated herein by reference in its entirety and for all purposes.

TECHNICAL FIELD

The present invention relates to the technical field of input methods, and in particular to an input method and system.

BACKGROUND

A Japanese input method usually involves mixed input of Japanese and English, that is, an English character string input by a user contains an English character corresponding to a kana character and an English character corresponding to an English entry; therefore, processing needs to be carried out according to the input English character string, so as to identify the English entry and the kana character in the English character string.

At present, the method of processing an English character string in a Japanese input method is: starting from the first English character of the English character string, using a left-to-right positive matching algorithm to segment the English character string to obtain segmentation results, and then successively matching in an input method lexicon; if a kana character is matched according to a segmentation result, it is determined that the segmentation result is a kana character; and if no kana character is matched according to the segmentation result, it is determined that the segmentation result is an English character.

However, when the input English character string contains Japanese and English, since a kana character corresponding to the English character string is obtained preferentially, a candidate entry of English vocabulary will be lost, thus it is not possible to obtain a valid candidate entry, so that the accuracy of the candidate entry displayed in the display box is low.

SUMMARY

On that account, an input method and system are provided in the embodiments of the present invention, which can increase the accuracy of a candidate entry displayed in a candidate display box.

An input method is provided in the embodiments of the present invention, comprising:
receiving at least two input English characters;
obtaining, according to the at least two English characters, a first candidate entry based on a first language;
obtaining, according to the at least two English characters, a second candidate entry based on a second language; and
obtaining, according to the first candidate entry and the second candidate entry, a third candidate entry.

In the above-mentioned method, the first candidate entry based on the first language is an English entry, and the second candidate entry based on the second language is a kana entry; or
the first candidate entry based on the first language is an English entry, and the second candidate entry based on the second language is a Chinese character entry.

In the above-mentioned method, the step of obtaining, according to the at least two English characters, a first candidate entry based on a first language comprises:
performing segmentation processing on the at least two English characters, so as to obtain segmentation results;
obtaining probability information about the segmentation results, with the probability information indicating the probability of the segmentation results being candidate entries based on the first language; and
taking a segmentation result corresponding to probability information indicating a probability greater than a preset probability threshold, as the first candidate entry based on the first language.

In the above-mentioned method, the first candidate entry based on the first language is an English entry, the second candidate entry based on the second language is a kana entry, and the step of obtaining the probability information about the segmentation results comprises: obtaining the probability information $P(E|c)$ about the segmentation results using the following formula:

$$P(E|c)=P(E)P(c|E)/(P(J)|P(c|J)+P(E)P(c|E))$$

where $P(E)$ is the prior probability of the segmentation result c being an English word, $P(c|E)$ is the conditional probability of the segmentation result c appearing in English vocabulary, $P(J)$ is the prior probability of the segmentation result c being a kana character, and $P(c|J)$ is the conditional probability of the segmentation result c appearing in an English character string corresponding to the kana character.

In the above-mentioned method, the step of obtaining, according to the first candidate entry and the second candidate entry, a third candidate entry comprises:
obtaining first position information about the first candidate entry in the at least two input English characters;
obtaining second position information about an English character string corresponding to the second candidate entry in the at least two input English characters; and
obtaining, according to the first candidate entry based on the first language, the first position information, the second candidate entry based on the second language and the second position information, the third candidate entry.

An input system is also provided in the embodiments of the present invention, comprising:
an input unit for receiving at least two input English characters;
an entry processing unit for obtaining, according to the at least two English characters, a first candidate entry based on a first language; obtaining, according to the at least two English characters, a second candidate entry based on a second language; and obtaining, according to the first candidate entry and the second candidate entry, a third candidate entry.

In the above-mentioned system, the first candidate entry based on the first language is an English entry, and the second candidate entry based on the second language is a kana entry; or
the first candidate entry based on the first language is an English entry, and the second candidate entry based on the second language is a Chinese character entry.

In the above-mentioned system, the entry processing unit is specifically used for:
performing segmentation processing on the at least two English characters, so as to obtain segmentation results;
obtaining probability information about the segmentation results, with the probability information indicating the probability of the segmentation results being candidate entries based on the first language; and taking a segmentation result corresponding to probability information indicating a probability greater than a preset probability threshold, as the first candidate entry based on the first language.

In the above-mentioned system, the first candidate entry based on the first language is an English entry, and the entry processing unit is specifically used for:

obtaining the probability information P(E|c) about the segmentation results using the following formula:

$$P(E|c)=P(E)P(c|E)/(P(J)|P(c|J)+P(E)P(c|E))$$

where P(E) is the prior probability of the segmentation result c being an English word, P(c|E) is the conditional probability of the segmentation result c appearing in English vocabulary, P(J) is the prior probability of the segmentation result c being a kana character, and P(c|J) is the conditional probability of the segmentation result c appearing in an English character string corresponding to the kana character.

In the above-mentioned system, the entry processing unit is specifically used for:

obtaining first position information about the first candidate entry in the at least two input English characters;

obtaining second position information about an English character string corresponding to the second candidate entry in the at least two input English characters; and obtaining, according to the first candidate entry based on the first language, the first position information, the second candidate entry based on the second language and the second position information, the third candidate entry.

It can be seen from the foregoing technical solution that the embodiments of the present invention have the beneficial effects as follows:

when an English character string is input, candidate entries based on two languages are obtained respectively; hence, when a combination of English and Japanese is input, or when a combination of English and Chinese is input, a candidate entry of one language will not be selected preferentially; therefore, no candidate entry will be lost, and a valid candidate entry can be obtained, thus enabling an improvement in the accuracy of the candidate entry displayed in the display box.

BRIEF DESCRIPTION OF THE ACCOMPANYING DRAWINGS

In order to illustrate the technical solutions of the embodiments of the present invention more clearly, the accompanying drawings required to be used in the embodiments are briefly introduced hereinafter. Clearly, the accompanying drawings in the following description are merely some embodiments of the present invention, and those of ordinary skill in the art can also obtain other drawings from these drawings without any inventive effort.

FIG. 1(a) to FIG. 1(b) are a system used in the technical solution provided in the embodiments of the present invention;

DETAILED DESCRIPTION OF THE PREFERRED EMBODIMENTS

For a better understanding of the technical solutions of the present invention, the embodiments of the present invention are described in detail below in conjunction with the accompanying drawings.

It should be made clear that the described embodiments are merely a portion of the embodiments of the present invention rather than all the embodiments. All other embodiments obtained by those of ordinary skill in the art based on the embodiments of the present invention without making inventive efforts are within the scope of protection of the present invention.

Figure 1:
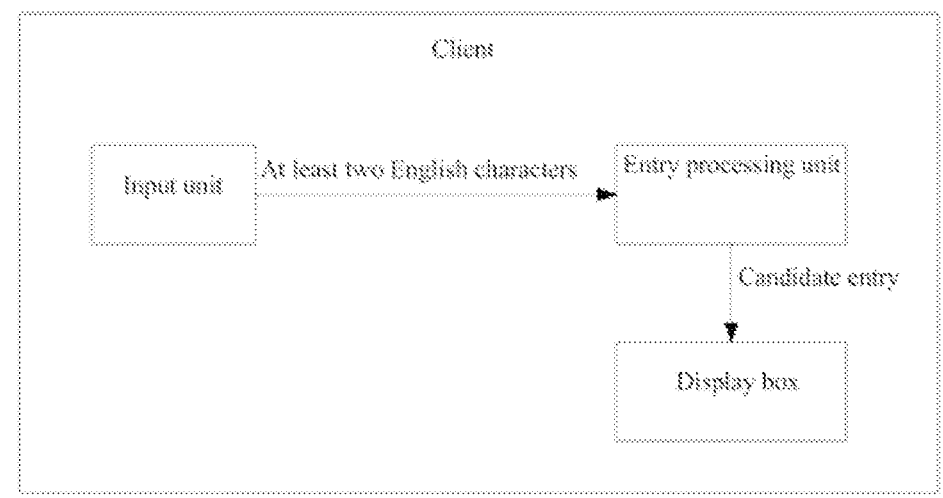
Figure 1:
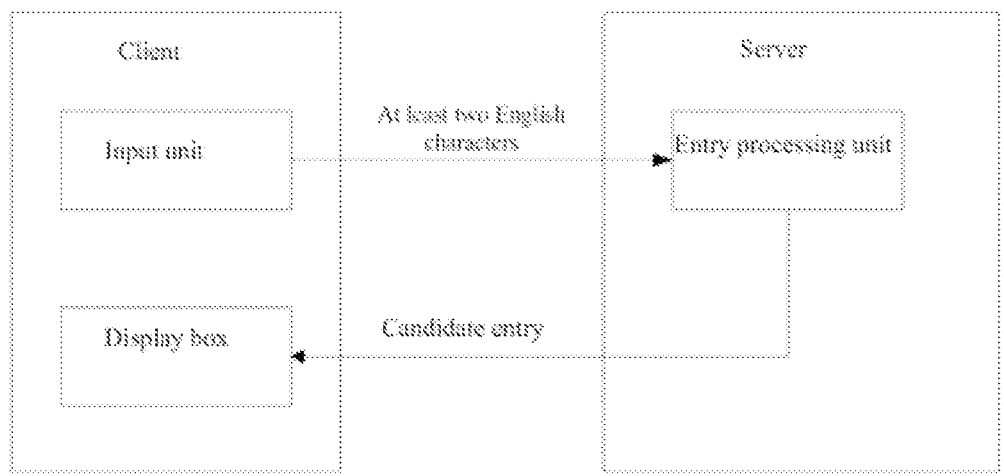

The system used in the technical solutions provided in the embodiments of the present invention is as shown in FIG. 1. The system may comprise an input unit and an entry processing unit; as shown in FIG. 1(a), the entry processing unit may be located in a client, and as shown in FIG. 1(b), the entry processing unit may also be located in a server. The entry processing unit is primarily used for obtaining a candidate entry according to input English characters. The client may be an input method client; the input method client comprises input method clients running on all the user equipment, and the user equipment may comprise a personal computer (PC), a notebook computer, a cellphone or a tablet computer.

An input method is given in the embodiments of the present invention; please refer to FIG. 2, which is a schematic flowchart of an input method provided in the embodiments of the present invention, and as shown in the figure, the method comprises the steps as follows:

S201, at least two input English characters are received.

Specifically, when a user uses a client and inputs characters in the client, the client will receive at least two English characters input by the user.

It should be noted that a Japanese input method comprises two input means, i.e. using kana characters to input Japanese and using English characters to input Japanese; only when English characters are used to input Japanese will the situation where a combination of Japanese and English is input appear, with the need to process the input English characters to obtain a kana candidate entry and/or an English candidate entry; by the same reasoning, a Chinese input method comprises a plurality of input means, such as a pinyin input means, a five-stroke input means, etc.; and only when the pinyin input means is used will the situation where a combination of Chinese and English is input appear, with the need to process the input English characters to obtain a Chinese character candidate entry and/or an English candidate entry. Therefore, in this step, at least two input English characters may be received, and processing may be performed according to the at least two input English characters.

S202, a first candidate entry based on a first language is obtained according to the at least two English characters.

Specifically, when the at least two input English characters are received, a first candidate entry based on a first language is obtained according to the at least two English characters, wherein the first candidate entry based on the first language may be an English entry.

By way of example, a method for obtaining a first candidate entry based on a first language according to at least two English characters may comprise:

first of all, segmentation processing is performed on the at least two English characters $l_1 l_2 \ldots l_n$, so as to obtain a segmentation result $c=l_i l_{i+1} \ldots l_j$, where n is an integer greater than or equal to 2, i is an integer greater than or equal to 1, and j is an integer which is greater than or equal to i and is smaller than or equal to n. The obtained segmentation result c comprises at least one English character.

Figure 3:
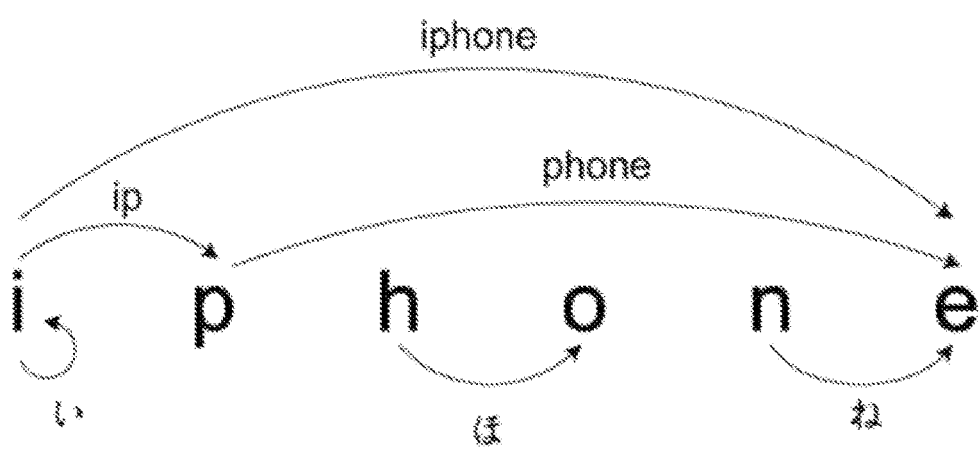
FIG. 3 is a schematic diagram of an English character string input in an input method provided in the embodiments of the present invention.

Please refer to FIG. 3, which is a schematic diagram of an English character string input in an input method provided in the embodiments of the present invention; as shown in FIG. 3, the input English characters are "iphone", and then the segmentation results comprise: "i", "ip", "iph", "ipho", "iphon", "iphone", "p", "ph", "pho", etc.

Then, probability information about the segmentation results is obtained, with the probability information indicating the probability of the segmentation results being candidate entries based on the first language.

For example, the first candidate entry based on the first language may be an English entry, and the second candidate entry based on the second language may be a kana entry; then the method for obtaining probability information about the segmentation result may be:

there is P(c)=P(J,c)+P(E,c), where P(c) is the prior probability of the segmentation result c appearing, P(J,c) is the probability of the segmentation result c appearing and the segmentation result c representing a kana character, and P(E, c) is the probability of the segmentation result c appearing and the segmentation result c representing an English word.

The probability information P(E c) about the segmentation results is obtained using the following formula:

$$P(E \mid c) = P(E, c) / P(c)$$
$$= P(E, c) / (P(J, c) + P(E, c))$$
$$= P(E)P(c \mid E) / P(J)P(c \mid J) + P(E)P(c \mid E))$$

where P(E,c) is the probability of the segmentation result c appearing and the segmentation result c representing an English word, P(c) is the prior probability of the segmentation result c appearing, P(J,c) is the probability of the segmentation result c appearing and the segmentation result c representing a kana character, P(E) is the prior probability of the segmentation result c being an English word, P(c|E) is the conditional probability of the segmentation result c appearing in English vocabulary, P(J) is the prior probability of the segmentation result c being a kana character, and P(c|J) is the conditional probability of the segmentation result c appearing in an English character string corresponding to the kana character.

For example, the prior probability P(J) of the segmentation result c being a kana character may be obtained using the following formula:

$$P(J)=C(J)/C(W)$$

where C(J) is the number of kana entries obtained according to the statistics of an input entry sample library in the input method client, and C(W) is the total number of all the entries obtained according to the statistics of the input entry sample library in the input method client.

The prior probability P(E) of the segmentation result c being an English word and the prior probability P(J) of the segmentation result c being a kana character may be obtained in advance through calculation by means of statistics; the prior probability P(E) corresponding to an English word and the prior probability P(J) corresponding to a kana character may be stored for each input method client; when it is required to obtain the prior probability P(E) of the segmentation result c being an English word and the prior probability P(J) of the segmentation result c being a kana character, the prior probability P(E) of the English word and the prior probability P(J) of the kana character corresponding to the input method client may be obtained according to a corresponding relationship stored in advance.

The method of obtaining the conditional probability P(c|J) of the segmentation result c appearing in an English character string corresponding to a kana character may be: assuming that the pronunciation of Japanese vocabulary is a one-order Markov process in units of kana character, that is, the probability distribution of the first kana character is only related to the starting position; taking the case where the probability distribution of the ith kana character is only related to the (i−1)th kana character as an example, one kana character is added before at least one kana character $k_1 k_2 \ldots k_n$, denoted as b, and one kana character is added after the at least one kana character $k_1 k_2 \ldots k_n$ at the same time, denoted as e; then the conditional probability P(k|J) of the at least one kana character $k_1 k_2 \ldots k_n$ appearing in an English character string corresponding to the at least one kana character $k_1 k_2, \ldots k_n$ may be:

$$P(k \mid J) = P(k_1 \mid b) P(k_0 \mid k_1) \ldots P(k_n \mid k_{n-1}) P(e \mid k_n)$$

where $P(k_1|b)$ is the probability of the kana character $k_1$ being the starting character in the kana entry, $P(e|k_n)$ is the probability of the kana character $k_n$ being the end character in the kana entry, and $P(k_i|k_{i-1})$ is the probability of the kana character $k_i$ appearing after the kana character $k_{i-1}$ in the kana entry, wherein statistics may be made according to the kana entries in the input method lexicon, so as to obtain the probability $P(k_1|b)$, the probability $P(e|k_n)$ and the probability $P(k_i|k_{i-1})$.

For example, the probability $P(k_i|k_{i-1})$ of the kana character $k_i$ appearing after the kana character $k_{i-1}$ in the kana entry may be obtained using the following formula:

$$P(k_i \mid k_{i-1}) = C(k_{i-1}, k_i) / C(k_{i-1})$$

where $C(k_{i-1},k_i)$ is the number of the character strings $k_{i-1}k_i$ being contained in a kana entry obtained according to the statistics of the input entry sample library in the input method client, and C(W) is the number of the character strings $k_{i-1}$ being contained in a kana entry obtained according to the statistics of the input entry sample library in the input method client.

Segmentation is performed on at least one kana character $k_1 k_2 \ldots k_n$ according to a Japanese segmentation rule; since Japanese segmentation will not produce segmentation ambiguity, if there is no valid segmentation, then the conditional probability of the segmentation result c appearing in the English character string corresponding to the kana character is P(c|J)=0; on the contrary, if there is valid segmentation, the conditional probability P(c|J) of the segmentation result c appearing in the English character string corresponding to the kana character is obtained using the above-mentioned method according to the segmentation result c, i.e. P(c|J)=P(k|J).

The method of obtaining the conditional probability P(c|E) of the segmentation result c appearing in English vocabulary may be: assuming that the pronunciation of the English vocabulary is a two-order Markov process in units of letters, that is, the probability distribution of the ith letter is only related to the (i−1)th letter and the (i−2)th letter; two English characters are added before at least one English character $c_1 c_2 \ldots c_n$, denoted as $b_1 b_2$, and an English character is added after the at least one English character $c_1 c_2 \ldots c_n$ at the same time, denoted as e, then the conditional probability P(c|E) of the at least one English character $c_1 c_2 \ldots c_n$ (equivalent to the above-mentioned segmentation result c) appearing in the English vocabulary may be:

$$P(c \mid E) = P(c_1 \mid b_1, b_2) P(c_2 \mid b_2, c_1) \ldots P(c_n \mid c_{n-2}, c_{n-1})$$
$$P(e \mid c_{n-1}, c_n)$$

where $P(c_1|b_1,b_2)$ is the probability of the English letter $c_1$ being the starting letter in the English entry, $P(c_2|b_2,c_1)$ is the probability of the English letter $c_2$ being located after the English letter $c_1$ in the English entry and the English letter $c_2$ being the second in the English entry, $P(c_n|c_{n-2},c_{n-1})$ is the probability of the English letter $c_n$ being located after the English letter $c_{n-2}$ and the English letter $c_{n-1}$ in the English entry, and $P(e|c_{n-1},c_n)$ is the probability of the English character string $c_{n-1}c_n$ being the end of the English entry.

Finally, after the probability information P(E|c) about the segmentation result is obtained, the probability information P(E|c) about the segmentation result may be compared with a preset probability threshold, and the segmentation result corresponding to probability information indicating a probability greater than the preset probability threshold is taken as the first candidate entry based on the first language in the embodiments of the present invention. For example, the preset probability threshold may be equal to 0.5. Here, using the probability threshold to screen the segmentation results, so as to obtain the first candidate entry, may filter out a large number of segmentation results produced due to segmentation ambiguity and may reduce the amount of subsequent processing. For example, as shown in FIG. 3, the segmentation results of the input English characters "iphone": "i", "ip", "iph", "ipho", "iphon", "iphone", "p", "ph", "pho", etc. are screened using the probability threshold, and the first candidate entries obtained comprise: "ip", "phone" and "iphone".

S203, a second candidate entry based on a second language is obtained according to the at least two English characters.

Specifically, when the at least two input English characters are received, a second candidate entry based on a second language is obtained according to the at least two English characters, wherein the second candidate entry based on the second language is a kana entry, or the second candidate entry based on the second language is a Chinese character entry.

By way of example, according to at least two English characters, segmentation processing may be performed on the at least two English characters using a left-to-right positive matching algorithm; the segmentation results are taken as second candidate entries based on the second language, and position information about each second candidate entry is recorded; for example, if the segmentation result is $s_i\ s_{i+1}\ \ldots\ s_j$, the position information about the second candidate entry is [i,j]; by taking at least two English characters $s=s_1 \ldots s_n$ as an example, with n being an integer greater than or equal to 2, a method for obtaining each second candidate entry according to at least two English characters is specifically explained as follows:

taking the case where the second candidate entry of the second language is a kana entry as an example, if a kana character is to be searched for in a preset corresponding relationship between a kana character and an English character string, the kana character should satisfy the following conditions: an English character string corresponding to the kana character is a prefix of at least two input English characters $s=s_1 \ldots s_n$, and the prefix is a prefix with the largest character length among all the prefixes of the at least two English characters $s=s_1 \ldots s_n$, where i is an integer which is greater than or equal to 1 and is smaller than or equal to n. $s_i\ s_{i+1} \ldots s_n$ represents a character string starting from the English character $s_i$ and ending with the English character $s_n$.

If a kana character which satisfies the above-mentioned conditions is found, the kana character found and position information [i,j] about same are recorded, with the position information meaning position information about the English character string $s_i\ s_{i+1}\ \ldots\ s_j$ corresponding to the kana character in the at least two English characters $s=s_1 \ldots s_n$, where j is an integer which is greater than or equal to 1 and smaller than or equal to n.

If no kana character which satisfies the above-mentioned conditions is found, then i=i+1, and the search for a kana character is continued according to the above-mentioned method in the preset corresponding relationship between a kana character and an English character string, and the searching stops when j=n.

Hence, at least one kana character may be found at last, and position information about each kana character therein is obtained; and the position information is equivalent to performing segmentation processing on the at least two input English characters. For example, as shown in FIG. 3, segmentation processing is performed on the English characters "iphone" using the left-to-right positive matching algorithm, and second candidate entries based on the second language, i.e. "い", "ほ" and "ね" are obtained.

S204, a third candidate entry is obtained according to the first candidate entry and the second candidate entry.

Specifically, first position information about the first candidate entry in the at least two input English characters is obtained according to the first candidate entry based on the first language obtained in S202: for example, if the first candidate entry is $c_{ij}=l_i\ l_{i+1}\ \ldots\ l_j$ then the first position information about the first candidate entry in the at least two input English characters $l_1\ l_2\ \ldots\ l_n$ is [i,j]. Furthermore, position information about the segmentation results was already recorded in S203; therefore, second position information about an English character string corresponding to the second candidate entry in the at least two input English characters may be obtained directly. The third candidate entry is obtained according to the first candidate entry based on the first language, the first position information, the second candidate entry based on the second language and the second position information.

By way of example, a method for obtaining the third candidate entry according to the first candidate entry based on the first language, the first position information, the second candidate entry based on the second language and the second position information may be:

first of all, since the first candidate entry is just a possible candidate entry, for example, the first candidate entry may be an English word and may not be an English word, it is required to screen the first candidate entry using an input method lexicon, and the screening method may be: matching, according to the first candidate entry, in the input method lexicon based on the first language; if the first candidate entry has a corresponding entry based on the first language in the input method lexicon, then recording the entry; on the contrary, if the first candidate entry does not have a corresponding entry in the input method lexicon, then removing the first candidate entry, thus being able to obtain at least one matched English word.

After that, if the second candidate entry based on the second language is a Chinese character entry, further processing need not be performed on the second candidate entry; and if the second candidate entry based on the second language is a kana entry, then matching needs to be performed in the input method lexicon based on the second language according to the second candidate entry, and if there is a corresponding entry, then the entry is recorded; on the contrary, if the second candidate entry does not have a corresponding entry in the input method lexicon, then the second candidate entry is removed; therefore, at least one kana entry or at least one Chinese character entry matched may be obtained.

Finally, the first candidate entry and/or the second candidate entry may be combined according to the entry matched using the first candidate entry, the entry matched using the second candidate entry, the position information about the first candidate entry and the position information about the second candidate entry, so as to obtain at least one third candidate entry. After the at least one third candidate entry is obtained, a weight value of the entry matched using the first candidate entry and a weight value of the entry matched using the second candidate entry may be obtained in the input method lexicon; and then a weight value of each third candidate entry is obtained according to the weight values of the entries, for example, the weight value of the third candidate entry may be obtained according to the product of the weight value of at least one entry of the third candidate entries. Then the third candidate entries are ranked according to the weight values in a large-to-small sequence, so as to obtain a ranking result; and the ranking result is displayed in a display box, so that the third candidate entries are provided to a user for the user to select.

The embodiments of the present invention further provide a device embodiment implementing each step and method in the above-mentioned method embodiments.

Figure 4:
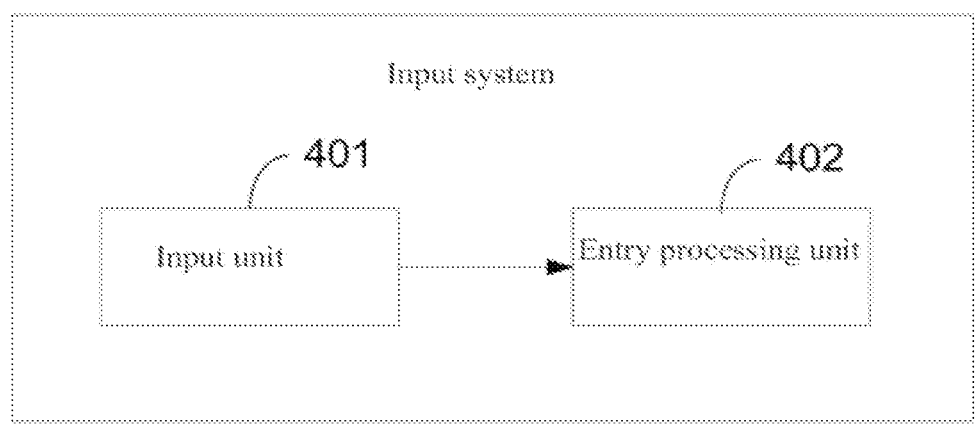
FIG. 4 is a functional block diagram of an input system provided in the embodiments of the present invention.

Please refer to FIG. 4, which is a functional block diagram of an input system provided in the embodiments of the present invention. As shown in the figure, the system comprises:

an input unit 401 for receiving at least two input English characters; and an entry processing unit 402 for obtaining, according to the at least two English characters, a first candidate entry based on a first language; obtaining, according to the at least two English characters, a second candidate entry based on a second language; and obtaining, according to the first candidate entry and the second candidate entry, a third candidate entry.

The first candidate entry based on the first language is an English entry, and the second candidate entry based on the second language is a kana entry; or the first candidate based on the first language is an English entry, and the second candidate entry based on the second language is a Chinese character entry.

When obtaining the first candidate entry based on the first language according to the at least two English characters, the entry processing unit 402 is specifically used for:

performing segmentation processing on the at least two English characters, so as to obtain segmentation results;

obtaining probability information about the segmentation results, with the probability information indicating the probability of the segmentation results being candidate entries based on the first language; and taking a segmentation result corresponding to probability information indicating a probability greater than a preset probability threshold, as the first candidate entry based on the first language.

The first candidate entry based on the first language is an English entry, and when obtaining probability information about the segmentation result, the entry processing unit 402 is specifically used for:

obtaining probability information P(E|c) about the segmentation results using the following formula:

$$P(E|c)=P(E)P(c|E)/(P(J)P(c|J)+P(E)P(c|E))$$

where P(E) is the prior probability of the segmentation result c being an English word, P(c|E) is the conditional probability of the segmentation result c appearing in English vocabulary, P(J) is the prior probability of the segmentation result c being a kana character, and P(c|J) is the conditional probability of the segmentation result c appearing in an English character string corresponding to the kana character.

When obtaining the third candidate entry according to the first candidate entry and the second candidate entry, the entry processing unit 402 is specifically used for:

obtaining first position information about the first candidate entry in the at least two input English characters;

obtaining second position information about an English character string corresponding to the second candidate entry in the at least two input English characters; and obtaining, according to the first candidate entry based on the first language, the first position information, the second candidate entry based on the second language and the second position information, the third candidate entry.

Figure 2:
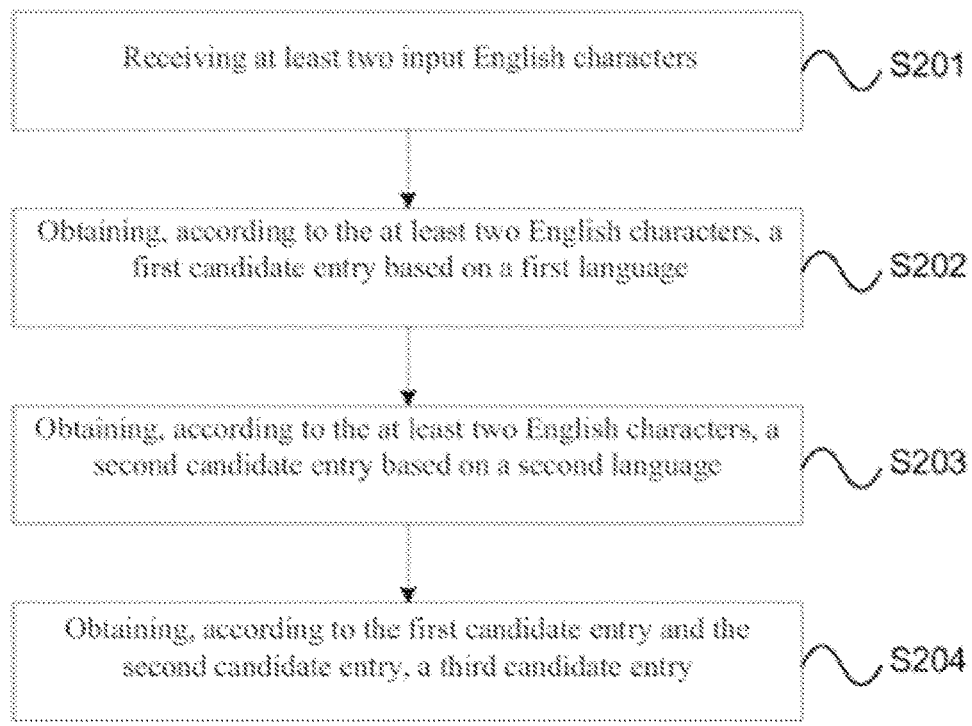
FIG. 2 is a schematic flowchart of an input method provided in the embodiments of the present invention.

Since various units in this embodiment can carry out the method shown in FIG. 2, for the part not described in detail in this embodiment, reference can be made to the relevant description of FIG. 2.

It can be seen from the description above that the method and system provided in the embodiments of the present invention have the advantages as follows:

1. when an English character string is input, candidate entries based on two languages are obtained respectively; hence, when a combination of English and Japanese is input, or when a combination of English and Chinese is input, a candidate entry of one language will not be selected preferentially; therefore, no candidate entry will be lost, and a valid candidate entry can be obtained, thus enabling an improvement in the accuracy of the candidate entry displayed in the display box.

2. In the prior art, if an input English character string has a plurality of segmentation results, a corresponding candidate entry will be obtained according to each segmentation result, so that there is a large number of candidate entries, and the sequence of the candidate entries displayed in the display box is obtained by manual weight adjustment; the number of the candidate entries displayed in each page in the display box is limited, therefore a valid candidate entry cannot be obtained promptly. In the embodiments of the present invention, candidate entries with a low probability may be screened out using a probability threshold, and thus the amount of subsequent processing of the candidate entries may be reduced to some extent.

In the technical solutions provided in the present invention, it shall be understood that the disclosed system, apparatus and method may be implemented in other manners. For example, the device embodiment described above is merely illustrative, for example, the division of the units is just logical function division, and there may be other ways of dividing the units during actual implementation.

The units described as separate components may or may not be physically separated, and components displayed as units may or may not be physical units, that is, may be located in one position, or may also be distributed on a plurality of network elements; and the objective of the solution of this embodiment may be implemented by selecting some or all of the units according to actual needs.

Furthermore, in various embodiments of the present invention, various functional units may be integrated into one processing unit, and various units may also exist alone physically, and two or more than two units may also be integrated into one unit; and the integrated unit above may be implemented in the form of hardware, and may also be implemented in the form of hardware and software functional units.

The integrated unit above implemented in the form of software functional units may be stored in a computer readable storage medium. The software functional units are stored in a storage medium and include several instructions for enabling a computer device (which can be a personal computer, a server, or a network device and so on) or a processor to execute some steps of the method described in the embodiments of the present invention. The foregoing storage medium comprises: various media that may store program codes, such as a universal serial bus (USB) flash driver, a removable hard disk, a read-only memory (ROM), a random access memory (RAM), a magnetic disk, or an optical disk.

The above description is merely preferred embodiments of the present invention, but is not used to limit the present invention. Any modification, equivalent replacement, or improvement made within the spirit and principle of the present invention shall fall within the scope of protection of the present invention.

What is claimed is:

1. An input method for text entry in mixed languages by processing English characters inputted on a computer, comprising:
   obtaining a first candidate entry in a first language according to at least two English characters typed via a keyboard associated with the computer, said obtaining the first candidate entry comprising performing first segmentation processing on the at least two English characters in the first language and identifying a first English character string in the at least two input English characters that corresponds to the first candidate entry;
   obtaining a second candidate entry in a second language according to the at least two English characters, said obtaining the second candidate entry comprising performing second segmentation processing on the at least two English characters in the second language and identifying a second English character string in the at least two input English characters that corresponds to the second candidate entry; and
   displaying one or more third candidate entries on the computer for selection as candidate of text to be inputted on the computer,
      wherein at least one of the third candidate entries includes the first candidate entry, the second candidate entry, or a combination thereof,
      wherein a sequence for said displaying the third candidate entries is based upon respective weight values of the third candidate entries and is non-preferential for the first language or the second language,
      wherein a selected third candidate entry of the one or more third candidate entries includes a combination of the first and second candidate entries, the method further comprising:
         obtaining first position information about the first candidate entry in the at least two input English characters, the first position information including first starting and ending positions of the first English character string in the at least two input English characters;
         obtaining second position information about the second candidate entry in the at least two input English characters, the second position information including second starting and ending positions of the second English character string in the at least two input English characters, positions of the first and second English character strings being non-overlapping in the at least two input English characters; and
         obtaining the selected third candidate entry by combining the first and second candidate entries based upon the first candidate entry, the first position information, the second candidate entry and the second position information.

2. The method of claim 1, further comprising receiving the at least two input English characters.

3. The method of claim 1, wherein the first candidate entry is an English entry, and wherein the second candidate entry is a kana entry.

4. The method of claim 1, wherein the first candidate entry is an English entry, and wherein the second candidate is a Chinese character entry.

5. The method of claim 1, wherein said obtaining the first candidate entry includes:
   performing the first segmentation processing on the at least two English characters to obtain segmentation results;
   obtaining probability information about the segmentation results, the probability information indicating a probability of the segmentation results being candidate entries based on the first language; and
   identifying a selected segmentation result corresponding to corresponding probability information indicating a probability greater than a preset probability threshold that the first candidate entry is based on the first language.

6. The method of claim 5,
   wherein the first candidate entry is an English entry,
   wherein the second candidate entry is a kana entry, and
   wherein said obtaining the probability information comprises obtaining the probability information P(E|c) about the segmentation results using a formula:

$$P(E|c)=P(E)P(c|E)/(P(J)P(c|J)+P(E)P(c|E))$$

wherein P(E) is a prior probability of the segmentation result c being an English word, P(c|E) is a conditional probability of the segmentation result c appearing in English vocabulary, P(J) is a prior probability of the segmentation result c being a kana character, and P(c|J) is a conditional probability of the segmentation result c appearing in an English character string corresponding to the kana character.

7. The method of claim 1, wherein a weight value of the selected third candidate entry is based on a product of respective weight values of the first candidate entry and the second candidate entry.

8. The method of claim 1, wherein, in the at least two input English characters,
   the first ending position of the first English character string is located before the second starting position of the second English character string; or
   the second ending position of the second English character string is located before the first starting position of the first English character string.

9. An input system for text entry in mixed languages by processing English characters inputted on a computer, comprising:
   a processor; and
   a memory having one or more programs stored thereon for instructing said processor to:
   receive at least two input English characters typed via a keyboard associated with the computer;

obtain a first candidate entry in a first language and a second candidate entry in a second language each based upon the at least two input English characters, wherein obtaining the first candidate entry includes performing first segmentation processing on the at least two English characters in the first language and identifying a first English character string in the at least two input English characters that corresponds to the first candidate entry, and wherein obtaining the second candidate entry includes performing second segmentation processing on the at least two English characters in the second language and identifying a second English character string in the at least two input English characters that corresponds to the second candidate entry; and display one or more third candidate entries on the computer for selection as candidate of text to be inputted on the computer,
- wherein at least one of the third candidate entries includes the first candidate entry, the second candidate entry, or a combination thereof,
- wherein a sequence for said displaying the third candidate entries is based upon respective weight values of the third candidate entries and is non-preferential for the first language or the second language,
- wherein a selected third candidate entry of the one or more third candidate entries includes a combination of the first and second candidate entries, the one or more programs instructing said processor to:
  - obtain first position information about the first candidate entry in the at least two input English characters, the first position information including first starting and ending positions of the first English character string in the at least two input English characters;
  - obtain second position information about the second candidate entry in the at least two input English characters, the second position information including second starting and ending positions of the second English character string in the at least two input English characters, positions of the first and second English character strings being non-overlapping in the at least two input English characters; and
  - obtain the selected third candidate entry by combining the first and second candidate entries based upon the first candidate entry, the first position information, the second candidate entry and the second position information.

10. The system of claim 9, wherein the first candidate entry is an English entry, and wherein the second candidate entry is a kana entry.

11. The system of claim 9, wherein the first candidate entry is an English entry, and wherein the second candidate entry is a Chinese character entry.

12. The system of claim 9, wherein the one or more programs stored thereon for instructing said processor to:
  - perform the first segmentation processing on the at least two English characters so as to obtain segmentation results;
  - obtain probability information about the segmentation results with the probability information indicating a probability of the segmentation results being candidate entries based on the first language; and
  - take a segmentation result corresponding to the probability information indicating a probability greater than a preset probability threshold as the first candidate entry based on the first language.

13. The system of claim 12, wherein the first candidate entry is an English entry, and wherein the one or more programs stored thereon for instructing said processor to obtain the probability information P(E c) about the segmentation results using the following formula:

$$P(E|c)=P(E)P(c|E)/(P(J)P(c|J)+P(E)P(c|E))$$

wherein P(E) is a prior probability of the segmentation result c being an English word, P(c|E) is a conditional probability of the segmentation result c appearing in English vocabulary, P(J) is a prior probability of the segmentation result c being a kana character, and P(c|J) is a conditional probability of the segmentation result c appearing in an English character string corresponding to the kana character.

14. The system of claim 9, wherein a weight value of the selected third candidate entry is based on a product of respective weight values of the first candidate entry and the second candidate entry.

15. The system of claim 9, wherein, in the at least two input English characters,
- the first ending position of the first English character string is located before the second starting position of the second English character string; or
- the second ending position of the second English character string is located before the first starting position of the first English character string.

16. A non-transitory computer storage medium including at least one program when implemented by a processor, comprising:
- instruction for obtaining a first candidate entry in a first language according to at least two English characters typed via a keyboard associated with a computer, said instruction for obtaining the first candidate entry comprising instruction for performing first segmentation processing on the at least two English characters in the first language and identifying a first English character string in the at least two input English characters that corresponds to the first candidate entry;
- instruction for obtaining a second candidate entry in a second language according to the at least two English characters, said instruction for obtaining the second candidate entry comprising instruction for performing second segmentation processing on the at least two English characters in the second language and identifying a second English character string in the at least two input English characters that corresponds to the second candidate entry; and
- instruction for displaying one or more third candidate entries on the computer for selection as candidate of text to be inputted on the computer,
  - wherein at least one of the third candidate entries includes the first candidate entry, the second candidate entry, or a combination thereof,
  - wherein a sequence for said displaying the third candidate entries is based upon respective weight values of the third candidate entries and is non-preferential for the first language or the second language,
  - wherein a selected third candidate entry of the one or more third candidate entries includes a combination of the first and second candidate entries, the at least one program comprising:

instruction for obtaining first position information about the first candidate entry in the at least two input English characters, the first position information including first starting and ending positions of the first English character string in the at least two input English characters;

instruction for obtaining second position information about the second candidate entry in the at least two input English characters, the second position information including second starting and ending positions of the second English character string in the at least two input English characters, positions of the first and second English character strings being non-overlapping in the at least two input English characters; and instruction for obtaining the selected third candidate entry by combining the first and second candidate entries based upon the first candidate entry, the first position information, the second candidate entry and the second position information.

17. The computer storage medium of claim 16, further comprising instruction for receiving the at least two input English characters.

18. The computer storage medium of claim 16, wherein the first candidate entry is an English entry, and wherein the second candidate entry is a kana entry.

19. The computer storage medium of claim 16, wherein the first candidate entry is an English entry, and wherein the second candidate is a Chinese character entry.

20. The computer storage medium of claim 16, wherein said instruction for obtaining the first candidate entry includes:

instruction for performing the first segmentation processing on the at least two English characters to obtain segmentation results;

instruction for obtaining probability information about the segmentation results, the probability information indicating a probability of the segmentation results being candidate entries based on the first language; and instruction for identifying a selected segmentation result corresponding to corresponding probability information indicating a probability greater than a preset probability threshold that the first candidate entry is based on the first language.

* * * * *